3,078,270
DERIVATIVES OF BENZOTHIADIAZINE-1,1-DIOXIDE

Warren J. Close and Leo R. Swett, Waukegan, Ill., assignors to Abbott Laboratories, North Chicago, Ill., a corporation of Illinois
No Drawing. Filed Aug. 14, 1959, Ser. No. 833,682
11 Claims. (Cl. 260—243)

This invention relates to compounds corresponding to the formula

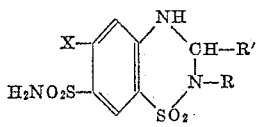

and a method for their preparation. In the above formula, X represents chlorine, bromine or trifluoromethyl, R represents hydrogen or loweralkyl and R' represents COOH, COO-loweralkyl, CONH₂, CONH-loweralkyl or CON(loweralkyl)₂. The term "loweralkyl" as employed throughout the specification and claims refers to the alkyl radicals containing from 1 to 4 carbon atoms, inclusive, whether branched or unbranched. These new compounds are crystalline solids and are extremely useful as diuretic agents when administered orally or by injection in non-toxic amounts.

The compounds of the present invention can be prepared as illustrated by the following series of reactions:

A.
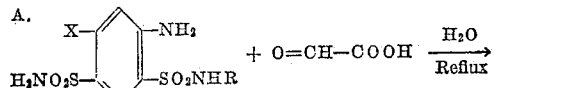

B.
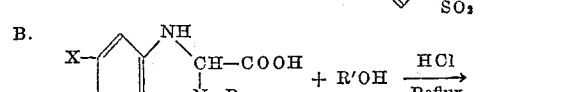

C.
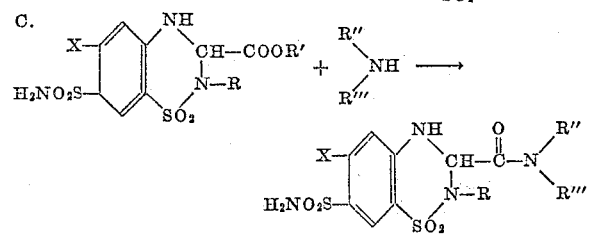

In the above series of reactions, R, R" and R'" represent hydrogen or loweralkyl, R' represents loweralkyl and X represents chlorine, bromine or trifluoromethyl.

Step A of the method can be conveniently carried out by heating equimolar amounts of the sulfonamide and glyoxylic acid (preferably an alkali metal salt of the acid) in water at or about the boiling temperature and under reflux until the reaction is complete. Upon cooling and acidifying, the desired 3-carboxy-6-halo-7-sulfamyl-3,4-dihydro-1,2,4-benzothiadiazine-1,1-dioxide separates as a crystalline solid which is removed by filtration and recrystallized from water or alcohol.

In step B of the method, the product obtained in Step A is esterified with a lower alkanol such as methanol, ethanol, propanol or butanol in the presence of a catalyst such as hydrogen chloride. The reaction is performed by employing a substantial molar excess of the alkanol and heating the reaction mixture preferably at or about the reflux temperature while gassing wtih a catalyst such as hydrogen chloride. Upon completion of the reaction, the reaction mixture is cooled to precipitate the desired 3 - carboalkoxy - 6-halo-2-alkyl-7-sulfamyl-3,4-dihydro-1,2,4-benzothiadiazine-1,1-dioxide which is filtered off and, if desired, purified by recrystallization from a suitable solvent. Alternatively, the excess solvent may be evaporated when the reaction is complete and the residue recrystallized to obtain the desired product.

The final step of the method is readily carried out by adding an excess of ammonia or a lower alkylamine to the product obtained in Step B. The reaction is preferably carried out at or about the boiling temperature of the amine. When the reaction is complete, the excess ammonia or amine is evaporated and the residue recrystallized from water or aqueous alcohol to obtain the desired 3-alkylcarbamyl-6-halo-2-alkyl-7-sulfamyl-3,4-dihydro-1,2,4-benzothiadiazine-1,1-dioxide as a crystalline solid.

In an alternative method of preparation, the compounds having the formula

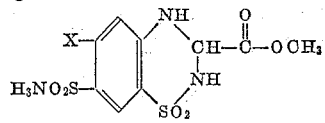

are readily prepared by adding one molecular proportion of diazomethane dissolved in a suitable solvent such as ether to one molecular proportion of a 3-carboxy-6-halo-7 - sulfamyl - 3,4-dihydro-1,2,4-benzothiadiazine-1,1-dioxide dissolved in a suitable solvent such as methanol. The reaction takes place smoothly at room temperature. When the reaction is complete, the solvents are evaporated and the residue recrystallized from methanol or other suitable solvents to obtain the desired product.

The compounds of the present invention which correspond to the formula

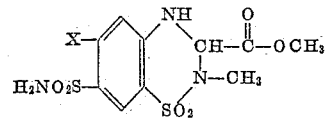

may be prepared, if desired, by the reaction of one molecular proportion of a 3-carboxy-6-halo-7-sulfamyl-3,4-dihydro-1,2,4-benzothiadiazine-1,1-dioxide with two molecular proportions of an alkylating agent such as diazomethane in the same manner as that described when only one molecular proportion of diazomethane is employed.

The following examples illustrate the invention but are not to be construed as a limitation thereof.

EXAMPLE 1
*3-Carboxy-6-Chloro-7-Sulfamyl-3,4-Dihydro-1,2,4-Benzothiadiazine-1,1-Dioxide*

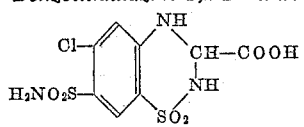

A suspension of 22.8 grams (.08 mole) of 4-amino-6-chloro-1,3-benzenedisulfonamide in 300 ml. of water was heated at the boiling temperature and under reflux. Thereafter, 8.8 grams (.12 mole) of glyoxylic acid dissolved in one equivalent of 5% aqueous sodium hydroxide was added portionwise with stirring and the resulting mixture refluxed for 1.5 hours. Upon completion of the reaction, the reaction mixture was cooled and acidified to precipitate a white solid. After recrystallization of this solid from water, the desired 3-carboxy-6-chloro-7-sulfamyl - 3,4-dihydro-1,2,4-benzothiadiazine-1,1-dioxide compound was obtained as a hydrate which melted at 125° C. with decomposition. *Anal.*—Calc'd. for $C_8H_8ClN_3O_6S_2 \cdot 2H_2O$ C=25.4%; H=3.2%. Found: C=25.4%, H=3.2%.

EXAMPLE 2

*3-Carbamoethoxy-6-Chloro-7-Sulfamyl-3,4-Dihydro-1,2,4-Benzothiadiazine-1,1-Dioxide*

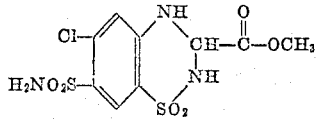

To a solution of 1.71 grams (.005 mole) of 3-carboxy-6 - chloro-7-sulfamyl-3,4-dihydro-1,2,4-benzothiadiazine-1,1-dioxide in 10 ml. of methanol was added portionwise with stirring at room temperature, .21 gram (.005 mole) of diazomethane dissolved in 40 ml. of ether. The solvents were thereafter evaporated and the residue recrystallized from methanol to obtain the above-named product as a crystalline solid melting at 234°–236° C. *Anal.*—Calc'd. for $C_9H_{10}ClN_3O_6S_2$: C=30.4%; H=2.8%. Found: C=30.4%; H=3.0%.

EXAMPLE 3

*3-Carbomethoxy-6-Chloro-2-Methyl-7-Sulfamyl-3,4-Dihydro-1,2,4-Benzothiadiazine-1,1-Dioxide*

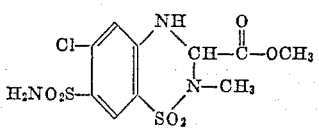

This compound was prepared in the same manner as that described in Example 2 except that the amount of diazomethane employed was doubled. The compound was found to melt at 224°–225° C. *Anal.*—Calc'd. for $C_{10}H_{12}ClN_3O_6S_2$: C=32.5%; H=3.2%. Found: C=32.6%; H=3.5%.

In an alternative method of preparation, 20 grams (.053 mole) of 3-carboxy-6-chloro-2-methyl-7-sulfamyl-3,4 - dihydro-1,2,4-benzothiadiazine-1,1-dioxide monohydrate (M.P.=154° C.) was dissolved in 100 ml. of methanol to which was added 6 grams of acetone dimethyl acetal and 2 ml. of concentrated hydrochloric acid. Thereafter, two more 6-gram portions of the acetal were added at room temperature at one hour intervals. The resulting mixture was heated overnight at 50° C. The solvents were then removed under reduced pressure and the residue recrystallized from a methanol-water mixture to obtain the desired 3-carbomethoxy-6-chloro-2-methyl-7-sulfamyl - 3,4-dihydro-1,2,4-benzothiadiazine-1,1-dioxide which melted at 225° C.

EXAMPLE 4

*3-Carboxy-6-Chloro-2-Methyl-7-Sulfamyl-3,4-Dihydro-1,2,4-Benzothiadiazine-1,1-Dioxide*

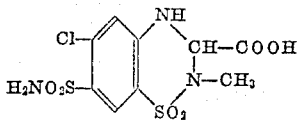

Six grams (.02 mole) of 4-amino-6-chloro-3-(methylsulfamyl)-benzenesulfonamide were dissolved in 60 ml. of water and the resulting solution heated at the boiling temperature and under reflux. A solution of 2.2 grams (.03 mole) of glyoxylic acid in 10 ml. of water was then added and the reaction mixture heated at the boiling temperature and under reflux for one hour. The reaction mixture was thereafter cooled to precipitate the desired above-named product as a hydrate which was separated by filtration. M.P.=156°–157° C. *Anal.*—Calc'd. for $C_9H_{10}ClN_3O_6S_2 \cdot H_2O$: C=28.9%; H=3.2%. Found: C=29.1%; H=3.4%.

EXAMPLE 5

*3-Carbamyl-6-Chloro-2-Methyl-7-Sulfamyl-3,4-Dihydro-1,2,4-Benzothiadiazine-1,1-Dioxide*

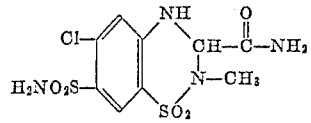

To 100 ml. of liquid ammonia at room temperature was added 2.9 grams (.0078 mole) of the product prepared in Example 3. The excess ammonia was thereafter evaporated and 20 ml. of water added to the residue. The white solid which precipitated was separated by filtration and found to melt at 245°–247° C. Upon analysis, the nitrogen content of 15.8% was found to agree with the calculated value for 3-carbamyl-6-chloro-2-methyl-7-sulfamyl-3,4-dihydro-1,2,4-benzothiadiazine-1,1-dioxide.

EXAMPLE 6

*6-Chloro-3-(Dimethylcarbamyl)-2-Methyl-7-Sulfamyl-3,4-Dihydro-1,2,4-Benzothiadiazine-1,1-Dioxide*

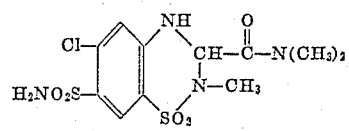

This compound was prepared by adding 7.12 grams (.02 mole) of 3-carbomethoxy-6-chloro-2-methyl-7-sulfamyl-3,4-dihydro-1,2,4-benzothiadiazine - 1,1 - dioxide to 100 ml. of dimethylamine at room temperature. The excess amine was then evaporated and 25 ml. of water added to the residue. The desired product precipitated as a white solid and after recrystallization from a methanol-water mixture melted at 265°–267° C. with decomposition. *Anal.*—Calc'd. for $C_{11}H_{15}ClN_4O_5S_2$: C=34.5%; H=3.9%. Found: C=34.6%; H=4.2%.

EXAMPLE 7

*3-(n-Butylcarbamyl)-6-Chloro-2-Methyl-7-Sulfamyl-3,4-Dihydro-1,2,4-Benzothiadiazine-1,1-Dioxide*

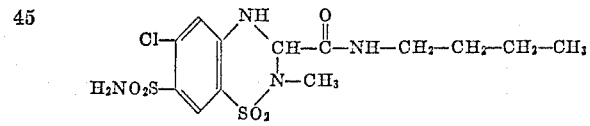

This compound was prepared by the reaction of 1.0 gram (.0027 mole) of 3-carbomethoxy-6-chloro-2-methyl-7 - sulfamyl - 3,4 - dihydro - 1,2,4 - benzothiadiazine - 1,1-dioxide with 10 ml. of n-butylamine in a manner similar to that described in Example 6. The resulting product was a white solid which melted at 260° C.

EXAMPLE 8

*6-Bromo-3-Carboxy-2-Methyl-7-Sulfamyl-3,4-Dihydro-1,2,4-Benzothiadiazine-1,1-Dioxide*

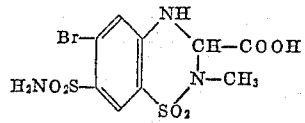

A solution of 6.8 grams (.02 mole) of 4-amino-6-bromo - 3 - (methylsulfamyl)-benzenesulfonamide in 100 ml. of boiling water was prepared and 3.0 grams (.04 mole) of glyoxylic acid added thereto. The resulting mixture was refluxed for 90 minutes to complete the reaction. The reaction mixture was then cooled and the desired product which precipitated was separated by filtration. It melted at 160°–162° C. with decomposition. *Anal.*—Calc'd. for $C_9H_{10}BrN_3O_6S_2 \cdot H_2O$: C=25.8%; H=2.9%. Found: C=25.7%; H=3.2%.

EXAMPLE 9

*6-Bromo-3-Carbomethoxy-2-Methyl-7-Sulfamyl-3,4-Dihydro-1,2,4-Benzothiadiazine-1,1-Dioxide*

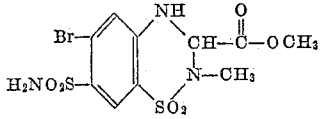

To a solution of 2.1 grams (.005 mole) of the product obtained in Example 8 in 10 ml. of methanol was added a solution of .21 gram (.005 mole) of diazomethane in 40 ml. of ether. The addition was carried out with stirring at room temperature. Upon completion of the reaction, the solvents were evaporated to obtain the desired product as a residue which melted at 224°–228° C. *Anal.*—Calc'd. for $C_{10}H_{12}BrN_3O_6S_2$: C=29.0%; H=2.9%. Found: C=29.0%; H=3.0%.

EXAMPLE 10

*3-Carboxy-7-Sulfamyl-6-Trifluoromethyl-3,4-Dihydro-1,2,4-Benzothiadiazine-1,1-Dioxide*

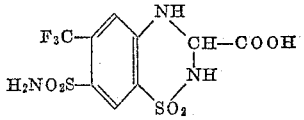

To a refluxing solution of 1.0 gram (.003 mole) of 4-amino-6-trifluoromethyl-1,3-benzenedisulfonamide in 15 ml. of water was added a solution of 0.33 gram (.0045 mole) of glyoxylic acid in 10 ml. of water. Following the addition, the reaction mixture was refluxed for 1.5 hours. Upon cooling, the desired product precipitated and was separated by filtration. M.P.=220° C. with decomposition.

EXAMPLE 11

*3-Carboxy-6-Chloro-2-Ethyl-7-Sulfamyl-3,4-Dihydro-1,2,4-Benzothiadiazine-1,1-Dioxide*

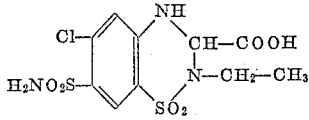

This compound was prepared in the same manner as that described in Example 4 by the reaction of 4-amino-6-chloro-3-(ethylsulfamyl)-benzenesulfonamide (M.P.=152°–154° C.) and glyoxylic acid. The monohydrate was a white solid which melted at 190°–191° C. with decomposition. Upon analysis, the product was found to contain 30.98% C; 3.92% H and 11.07% N compared to the theoretical values of 30.96% C; 3.63% H and 10.83% N.

EXAMPLE 12

*3-Carbomethoxy-6-Chloro-2-Ethyl-7-Sulfamyl-3,4-Dihydro-1,2,4-Benzothiadiazine-1,1-Dioxide*

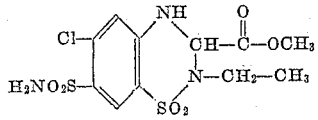

This compound was prepared by the reaction of the compound prepared in Example 11 with excess methanol. The procedure was identical to that described in the alternative method employed in Example 3. The product was a crystalline solid which melted at 222°–224° C.

EXAMPLE 13

*6-Chloro-2-Methyl-3-(Methylcarbamyl)-7-Sulfamyl-3,4-Dihydro-1,2,4-Benzothiadiazine-1,1-Dioxide*

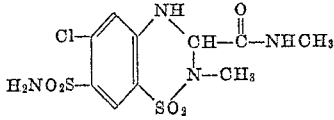

This compound was prepared by adding .02 mole of 3-carbomethoxy-6-chloro-2-methyl-7-sulfamyl-3,4-dihydro-1,2,4-benzothiadiazine-1,1-dioxide to 100 ml. of monomethylamine at room temperature. The excess amine was thereafter evaporated and the residue crystallized from a methanol-water mixture to obtain the desired product as a white, crystalline solid melting at 270°–271° C. with decomposition. The product was further identified by elemental analysis.

EXAMPLE 14

By the reaction of 4-amino-6-chloro-3-(isopropyl-sulfamyl)-benzenesulfonamide (M.P.=155°–157° C.) with glyoxylic acid as described in Example 4, the desired 3-carboxy-6-chloro-2-isopropyl-7-sulfamyl-3,4-dihydro-1,2,4-benzothiadiazine-1,1-dioxide is obtained. Further reaction with excess methanol as described in the alternative method employed in Example 3 results in the formation of 3-carbomethoxy-6-chloro-2-isopropyl-7-sulfamyl-3,4-dihydro-1,2,4-benzothiadiazine-1,1-dioxide.

In a manner similar to that described in the foregoing examples, other derivatives of 7-sulfamyl-3,4-dihydro-1,2,4-benzothiadiazine-1,1-dioxide can be prepared of which the following are representative:

3-carboxy-6-chloro-2-n-butyl derivative by the reaction of 4-amino-6-chloro-3-(n-butylsulfamyl)-benzenesulfonamide with glyoxylic acid. Further reaction of this derivative with methanol, ethanol, n-propyl alcohol or tert. butyl alcohol in the presence of hydrogen chloride results in the formation of the 3-carbomethoxy-6-chloro-2-n-butyl; 3-carbethoxy-6-chloro-2-n-butyl; 3-carbo-n-propoxy-6-chloro-2-n-butyl and 3-carbo-tert.-butoxy-6-chloro-2-n-butyl derivatives, respectively. Subsequent reaction of any of these 3-carboalkoxy-6-chloro-2-n-butyl derivatives with ammonia, monomethylamine, dimethylamine, monoethylamine, diethylamine, monopropylamine, dipropylamine, monobutylamine or dibutylamine will produce the 3-carbamyl-6-chloro-2-n-butyl; 3-methylcarbamyl-6-chloro-2-n-butyl; 3-dimethylcarbamyl-6-chloro-2-n-butyl; 3-ethylcarbamyl-6-chloro-2-n-butyl; 3-diethylcarbamyl-6-chloro-2-n-butyl; 3-propylcarbamyl-6-chloro-2-n-butyl; 3-dipropylcarbamyl-6-chloro-2-n-butyl; 3-butylcarbamyl-6-chloro-2-n-butyl and 3-dibutylcarbamyl-6-chloro-2-n-butyl derivatives of 7-sulfamyl-3,4-dihydro-1,2,4-benzothiadiazine-1,1-dioxide, respectively.

3-carboxy-6-bromo-2-ethyl derivative by the reaction of 4-amino-6-bromo-3-(ethylsulfamyl)-benzenesulfonamide with glyoxylic acid. Further reaction of this derivative with methanol, ethanol, isopropyl alcohol or sec. butyl alcohol in the presence of hydrogen chloride results in the formation of the 3-carbomethoxy-6-bromo-2-ethyl; 3-carbethoxy-6-bromo-2-ethyl; 3-carbo-isopropoxy-6-bromo-2-ethyl and 3-carbo-sec.-butoxy-6-bromo-2-ethyl derivatives, respectively. Subsequent reaction of any of these 3-carboalkoxy-6-bromo-2-ethyl derivatives with ammonia, monomethylamine, dimethylamine, monoethylamine, diethylamine, monopropylamine, dipropylamine, monobutylamine or dibutylamine will produce the 3-carbamyl-6-bromo-2-ethyl; 3-methylcarbamyl-6-bromo-2-ethyl; 3-dimethylcarbamyl-6-bromo-2-ethyl; 3-ethylcarbamyl-6-bromo-2-ethyl; 3-diethylcarbamyl-6-bromo-2-ethyl; 3-propylcarbamyl-6-bromo-2-ethyl; 3-dipropylcarbamyl-6-bromo-2-ethyl; 3-butylcarbamyl-6-bromo-2-ethyl and 3-dibutylcarbamyl-6-bromo-2-ethyl derivatives of 7-sulfamyl-3,4-dihydro-1,2,4-benzothiadiazine-1,1-dioxide, respectively.

3-carboxy-6-trifluoromethyl-2-methyl derivative by the reaction of 4-amino-6-trifluoromethyl-3-(methylsulfamyl)-benzenesulfonamide with glyoxylic acid. Further reaction of this derivative with methanol, ethanol, propanol or isobutanol in the presence of hydrogen chloride results in the formation of the 3-carbomethoxy-6-trifluoromethyl-2-methyl; 3-carbethoxy-6-trifluoromethyl-2-methyl; 3-carbopropoxy-6-trifluoromethyl-2-methyl and 3-carbo-isobutoxy-6-trifluoromethyl-2-methyl derivatives, respectively. Subsequent reaction of any of these 3-carboalkoxy-6-trifluoromethyl-2-methyl derivatives with ammonia, monomethylamine, dimethylamine, monoethylamine, diethylamine, monopropylamine, dipropylamine, monobutylamine or dibutylamine will produce the 3-carbamyl-6-trifluoromethyl-2-methyl; 3-methylcarbamyl-6-trifluoromethyl-2-methyl; 3-dimethylcarbamyl - 6 - trifluoromethyl - 2 - methyl; 3-ethylcarbamyl-6-trifluoromethyl-2-methyl; 3-diethylcarbamyl - 6 - trifluoromethyl-2-methyl; 3-propylcarbamyl-6-trifluoromethyl-2-methyl; 3-dipropylcarbamyl-6-trifluoromethyl-2-methyl; 3-butylcarbamyl-6-trifluoromethyl - 2 - methyl and 3-dibutylcarbamyl-6-trifluoromethyl-2-methyl derivatives of 7-sulfamyl-3,4-dihydro-1,2,4-benzothiadiazine-1,1-dioxide, respectively.

The sulfonamide compounds employed as one of the starting materials in the present invention can be prepared as shown in the following series of reactions wherein X is chlorine, bromine or trifluoromethyl and R is a lower-alkyl radical containing from 1 to 4 carbon atoms, inclusive:

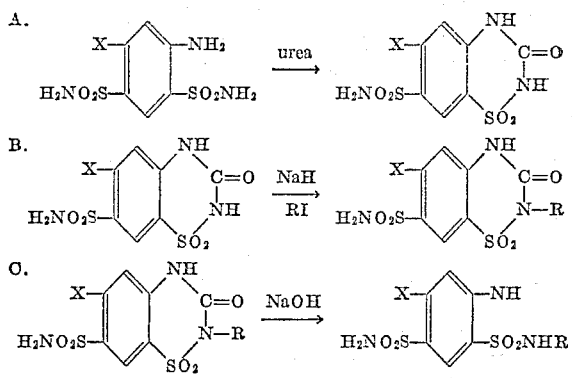

Step A of the method can be carried out conveniently by heating a mixture of two molecular proportions of urea and one molecular proportion of a 5-halo-2,4-disulfamylaniline at a temperature of about 180° C. for a period of about one hour. Upon completion of the reaction, water is added to the reaction mixture which is thereafter heated to effect solution. The aqueous solution is then treated with charcoal and filtered. The filtrate is acidified to precipitate the desired 3-keto-6-halo-7-sulfamyl - 3,4 - dihydro - 1,2,4 - benzothiadiazine-1,1-dioxide as a crystalline solid which is separated by filtration and dried.

Step B of the method is carried out by adding one molecular proportion of an alkali metal hydride, preferably sodium hydride, to a solution of one molecular proportion of a 3-keto-6-halo-7-sulfamyl-3,4-dihydro-1,2,4-benzothiadiazine-1,1-dioxide in dry dimethylformamide. The mixture is stirred and heated to about 70° C. to effect solution. One molecular proportion of an alkyl iodide dissolved in dimethylformamide is thereafter added dropwise and stirring is continued for about two hours at 70° C. When the reaction is complete, the reaction mixture is poured into water and cooled below room temperature to precipitate the desired 2-alkyl-3-keto-6-halo-7-sulfamyl-3,4-dihydro - 1,2,4 - benzothiadiazine-1,1-dioxide as a crystalline solid which is separated by filtration and dried.

In Step C of the method, a mixture of a 2-alkyl-3-keto-6-halo-7-sulfamyl - 3,4 - dihydro - 1,2,4 - benzothiadiazine-1,1-dioxide and an aqueous alkali metal hydroxide solution, preferably sodium hydroxide, is heated at the boiling temperature and under reflux for a period of time to complete the reaction. After treatment with charcoal, the reaction mixture is filtered and the filtrate acidified to obtain the desired 2-alkylsulfamyl-4-sulfamyl-5-haloaniline as a white solid which is separated and dried.

What we desire to particularly point out and distinctly claim as our invention is:

1. 3-carbomethoxy-6-chloro-2-methyl-7-sulfamyl-3,4-dihydro-1,2,4-benzothiadiazine-1,1-dioxide.
2. 3-carboxy-6-chloro-2-methyl-7-sulfamyl-3,4-dihydro-1,2,4-benzothiadiazine-1,1-dioxide.
3. 3-carbamyl-6-chloro - 2 - methyl-7-sulfamyl-3,4-dihydro-1,2,4-benzothiadiazine-1,1-dioxide.
4. 6-chloro-3-(dimethylcarbamyl)-2-methyl-7-sulfamyl-3,4-dihydro-1,2,4-benzothiadiazine-1,1-dioxide.
5. 6-bromo-3-carboxy-2-methyl-7-sulfamyl-3,4-dihydro-1,2,4-benzothiadiazine-1,1-dioxide.
6. 6-bromo-3-carbomethoxy-2-methyl-7-sulfamyl-3,4-dihydro-1,2,4-benzothiadiazine-1,1-dioxide.
7. 3-carboxy-7-sulfamyl-6-trifluoromethyl - 3,4-dihydro-1,2,4-benzothiadiazine-1,1-dioxide.
8. 3-carbomethoxy-6-chloro-2-ethyl-7 - sulfamyl-3,4-dihydro-1,2,4-benzothiadiazine-1,1-dioxide.
9. 6-chloro-2-methyl-3-(methylcarbamyl)-7 - sulfamyl-3,4-dihydro-1,2,4-benzothiadiazine-1,1-dioxide.
10. Compounds selected from the group consisting of (a) a compound corresponding to the formula

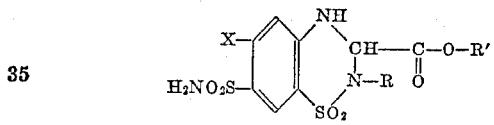

and (b) a compound corresponding to the formula

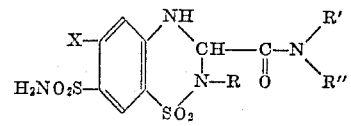

wherein X is a member selected from the group consisting of chlorine, bromine and trifluoromethyl, and R, R' and R" are members selected from the group consisting of hydrogen and lower alkyl.

11. A compound of the formula

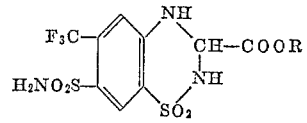

wherein R is a member selected from the group consisting of hydrogen and lower alkyl.

References Cited in the file of this patent

Freeman et al.: Jour. Org. Chem., volume 16 (1951), page 821.

Wagner et al.: Synthetic Organic Chemistry, pages 480–481 and 568–569 (1953).